US012663828B2

(12) United States Patent
Gaddh et al.

(10) Patent No.: US 12,663,828 B2
(45) Date of Patent: Jun. 23, 2026

(54) TIMEOUT PERIOD GENERATION

(71) Applicant: Arm Limited, Cambridge (GB)

(72) Inventors: Rohan Gaddh, Cambridge (GB);
Thomas Sean Houlihane, Cambridge
(GB)

(73) Assignee: Arm Limited, Cambridge (GB)

( * ) Notice: Subject to any disclaimer, the term of this
patent is extended or adjusted under 35
U.S.C. 154(b) by 153 days.

(21) Appl. No.: 18/791,848

(22) Filed: Aug. 1, 2024

(65) Prior Publication Data

US 2026/0037021 A1 Feb. 5, 2026

(51) Int. Cl.
| | |
|---|---|
| *G06F 1/12* | (2006.01) |
| *G06F 1/14* | (2006.01) |
| *G06F 13/42* | (2006.01) |
| *H04L 5/00* | (2006.01) |
| *H04L 7/00* | (2006.01) |

(52) U.S. Cl.
CPC . *G06F 1/12* (2013.01); *G06F 1/14* (2013.01)

(58) Field of Classification Search
CPC ..................................... G06F 1/12; G06F 1/14
See application file for complete search history.

(56) References Cited

U.S. PATENT DOCUMENTS

| | | | | |
|---|---|---|---|---|
| 7,664,213 B2 * | 2/2010 | Hassan | ...................... | H03L 7/18 |
| | | | | 375/354 |
| 10,564,666 B2 * | 2/2020 | Morgan | ................... | H04R 3/00 |
| 11,115,217 B2 * | 9/2021 | Shekh-Yusef | ......... | H04L 9/3263 |
| 2012/0210198 A1 * | 8/2012 | Gale | ......................... | G05B 9/03 |
| | | | | 711/E12.001 |
| 2016/0006343 A1 * | 1/2016 | Terada | .................... | H02M 1/36 |
| | | | | 307/104 |
| 2021/0216095 A1 * | 7/2021 | Szymanski | ............... | G06F 1/12 |
| 2022/0271853 A1 * | 8/2022 | Mater | .................... | H04J 3/0658 |
| 2024/0388519 A1 * | 11/2024 | Jordan | .................... | H04L 41/06 |
| 2025/0190008 A1 * | 6/2025 | Rygh | .................. | G06F 13/4059 |

* cited by examiner

*Primary Examiner* — Xuxing Chen

(74) *Attorney, Agent, or Firm* — NIXON &
VANDERHYE P.C.

(57) ABSTRACT

There is provided an apparatus comprising first processing
circuitry operating in a first clock domain having a first clock
signal operating at a first clock period. The apparatus is
provided with timeout period generation circuitry to couple
with a second clock domain to generate a timeout clock
signal, the second clock domain comprising second process-
ing circuitry and having a second clock signal operating at
a second clock period. The apparatus is provided with
control circuitry to compare first data generated by the first
processing circuitry against second data received from the
second processing circuitry. The control circuitry is config-
ured to indicate when the first and second data do not match
within a timeout period. The timeout period generation
circuitry is configured to receive second clock information
indicative of the second clock period and to generate the
timeout clock signal based on the second clock information
and the first clock period.

20 Claims, 11 Drawing Sheets

TIMEOUT PERIOD GENERATION

TECHNICAL FIELD

The present invention relates to data processing. More particularly the present invention relates to an apparatus, a system, a chip containing product, a method, and a computer readable medium.

BACKGROUND

Some apparatuses are provided with processing circuitry operating in a first clock domain in which there is a first clock signal having a first clock period. The processing circuitry may be configured to couple with second processing circuitry operating in a second clock domain in which there is a second clock signal having a second clock period.

SUMMARY

According to a first aspect of the present techniques there is provided an apparatus comprising:

first processing circuitry operating in a first clock domain having a first clock signal operating at a first clock period;

timeout period generation circuitry configured to couple with a second clock domain to generate a timeout clock signal having a timeout clock period, the second clock domain comprising second processing circuitry and having a second clock signal operating at a second clock period; and control circuitry configured to compare first data generated by the first processing circuitry against second data received from the second processing circuitry, and to indicate when the first data and the second data do not match within the timeout clock period, wherein the timeout period generation circuitry is configured to receive second clock information indicative of the second clock period from the second clock domain and to generate the timeout clock signal based on the second clock information and the first clock period.

According to a second aspect of the present techniques there is provided a system comprising:

the apparatus according to the first aspect, implemented in at least one packaged chip;

at least one system component; and a board, wherein the at least one packaged chip and the at least one system component are assembled on the board.

According to a third aspect of the present techniques there is provided a chip-containing product comprising the system according to the second aspect, wherein the system is assembled on a further board with at least one other product component.

According to a fourth aspect of the present techniques there is provided a method of operating an apparatus comprising first processing circuitry operating in a first clock domain having a first clock signal operating at a first clock period, the method comprising:

coupling with a second clock domain, the second clock domain comprising second processing circuitry and having a second clock signal operating at a second clock period;

receiving second clock information indicative of the second clock period from the second clock domain and generating a timeout clock signal having a timeout clock period based on the second clock information and the first clock period; and comparing first data generated by the first processing circuitry against second data received from the second processing circuitry, and indicating when the first data and the second data do not match within the timeout clock period.

According to a fifth aspect of the present techniques there is provided a non-transitory computer-readable medium storing computer-readable code for fabrication of an apparatus comprising:

first processing circuitry operating in a first clock domain having a first clock signal operating at a first clock period;

timeout period generation circuitry configured to couple with a second clock domain to generate a timeout clock signal having a timeout clock period, the second clock domain comprising second processing circuitry and having a second clock signal operating at a second clock period; and control circuitry configured to compare first data generated by the first processing circuitry against second data received from the second processing circuitry, and to indicate when the first data and the second data do not match within the timeout clock period, wherein the timeout period generation circuitry is configured to receive second clock information indicative of the second clock period from the second clock domain and to generate the timeout clock signal based on the second clock information and the first clock period.

BRIEF DESCRIPTION OF THE DRAWINGS

The present invention will be described further, by way of example only, with reference to configurations thereof as illustrated in the accompanying drawings, in which.

DESCRIPTION OF EXAMPLE CONFIGURATIONS

Figure 1:
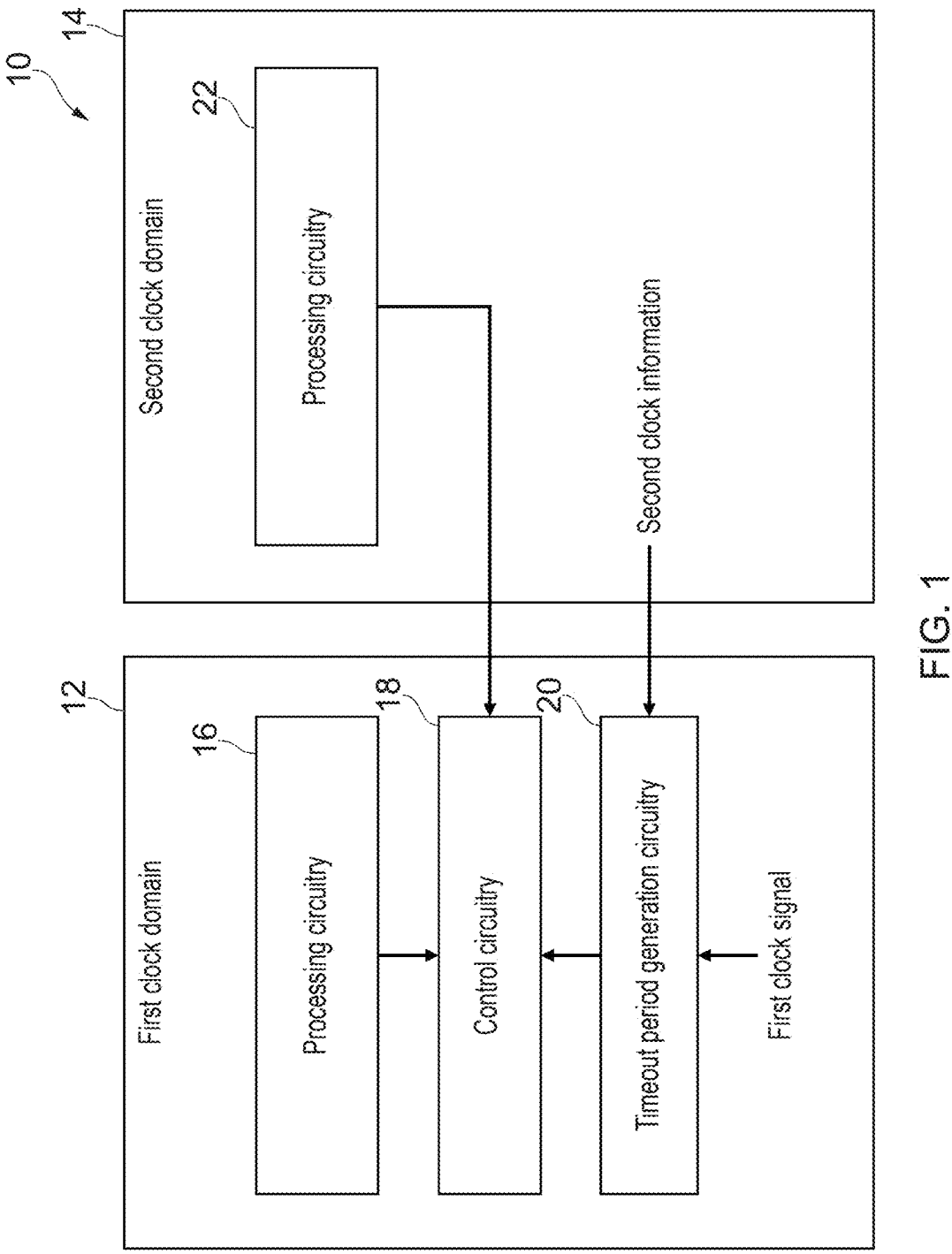
FIG. 1 schematically illustrates an apparatus according to some configurations of the present techniques.

Before discussing the configurations with reference to the accompanying figures, the following description of configurations is provided.

Some apparatuses may be configured to operate in a first clock domain and may be required to interact with processing circuitry operating in a second clock domain. In general, the first clock domain and the second clock domain may be designed by different groups according to different constraints and, as such, it may not be known at the time of design or manufacture what clock signals are to be used for the first clock domain and the second clock domain. As a result, care must be taken at the interface between different clock domains because different clock signals provided in different clock domains may result in a variable latency. This may be the case even if the different clock domains are using clocks that are set to a same frequency because there may be variations in phase between the clock signals and/or latencies associated with the transmission of the clock signals (and other associated signals) that introduce phase or time discrepancies between the clock domains.

Particular care may be required where processing circuitry is provided that is configured to produce a result that is to be compared against a second clock domain. The variable latency that can be introduced between the different clock domains means that it may not be possible, at the time of manufacturing, to determine exactly when the results should be compared, i.e., when the results provided by each clock domain should be the same. It may be theoretically possible to design for a worst case scenario, e.g., by calculating a maximum possible difference between clock signals in the two domains (for example, based on known clock frequency limits that may be applied to different processing circuits) and implementing counters to ensure that the first processing circuitry waits for a sufficient length of time from the expected arrival of a result from the second processing circuitry. However, such an approach has a number of downsides. First, a counter may be required for each clock domain crossing. Secondly, the assumption of a worst case scenario may result in an unnecessarily long latency being implemented.

According to some configurations of the present techniques there is provided an apparatus comprising first processing circuitry operating in a first clock domain having a first clock signal operating at a first clock period. The apparatus is also provided with timeout period generation circuitry configured to couple with a second clock domain to generate a timeout clock signal having a timeout clock period, the second clock domain comprising second processing circuitry and having a second clock signal operating at a second clock period. The apparatus is also provided with control circuitry configured to compare first data generated by the first processing circuitry against second data received from the second processing circuitry, and to indicate when the first data and the second data do not match within the timeout clock period. The timeout period generation circuitry is configured to receive second clock information indicative of the second clock period from the second clock domain and to generate the timeout clock signal based on the second clock information and the first clock period.

The processing circuitry is provided to generate first data which is to be compared against second data generated by second processing circuitry. The second processing circuitry may therefore be provided as a level of redundancy to enable the first data, generated by the first processing circuitry, to be checked (for example, to ensure data accuracy or security). The inventors have realised that a timeout clock signal appropriate for ensuring that second data has been received from the second processing circuitry can be generated based on the first clock period and an identification of the second clock period. Whilst, in general, the second clock period may not be known to the first processing circuitry at the time of design/manufacturing, the second clock period will be known to the second processing circuitry. Hence, the timeout period generation circuitry is configured to receive information indicating the second clock period from the second clock domain. Based on the combination of the first clock period and the second clock information, the timeout period generation circuitry can generate a timeout clock signal taking into account both the first period and the second period. The provision of a timeout clock signal based on both clock periods that can be provided to the control circuitry avoids the need to implement counters for each clock domain crossing and avoids the need to assume a worst case scenario. As a result, the total circuit area required for the first processing circuitry and the second processing circuitry to interface with one another is reduced and the potential maximum latency is also reduced.

The second clock information may be provided in any form. For example, the second clock information may be provided as a set of bits identifying the second clock value. In some configurations the timeout period generation circuitry is configured to generate the timeout clock signal using a delay loop coupling the first clock domain to the second clock domain, the delay loop providing a first delay indicative of the first clock period to be combined with a second delay indicative of the second clock period provided in the second clock domain. The delay loop may be implemented across both the first clock domain and the second clock domain and may be configured to measure a round trip time for a pulse in which the pulse is delayed based on the first clock signal in the first domain and is delayed based on the second clock signal in the second clock domain. The timeout clock signal may then be generated based on the pulse and is provided having a period that is defined by both the first clock period and the second clock period.

In some configurations the timeout period generation circuitry is configured to: receive, on the delay loop, an input clock generating signal from the second clock domain, the input clock generating signal indicative of an output clock generating signal received from the first processing circuitry on the delay loop delayed by an amount indicative of the second clock period; delay the input clock generating signal by an amount indicative of the first clock period to generate the output clock generating signal; and signal the output clock generating signal to the second clock domain using the delay loop. In other words, the delay loop may comprise an output signal pathway from the first processing circuitry and an input signal pathway to the first processing circuitry. A signal is output on the output signal pathway to the second processing circuitry. The signal provided on the output signal pathway is of a form that is suitable to be received by the second processing circuitry which will implement a delay to that signal based on the second clock period. For example, the second processing circuitry may delay the signal by at least one clock period. The input signal pathway is provided for the delayed signal to be sent back to the first processing circuitry which then implements a delay based on the first clock signal, for example, by delaying the delayed signal received on the input signal pathway by one or more first clock periods. This signal is then output again on the output signal pathway. As a result, a round trip time for the signal on the delay pathway is dependent at least on the first clock period and the second clock period.

In some configurations the apparatus comprises synchronisation circuitry configured to receive, on the delay loop, an asynchronous input clock generating signal from the second clock domain and to store the asynchronous input clock generating signal for at least the first clock period in order to generate the input clock generating signal. Signals received from outside of the first clock domain may require pre-processing to ensure that those signals are suitable for use within the first clock domain. For example, where a signal is received from outside of the first clock domain, that signal may change value from a first logical state (one of logical zero and logical one) to a second logical state (the other of logical zero and logical one) according to a clock signal in the second clock domain. However, because the two clock domains are asynchronous with one another, there is a risk that the received signal (either on the delay loop or otherwise) changes between logical one and logical zero on a first clock edge. As a result, the received value on that clock edge may not be strictly defined and may be in a metastable state. The synchronisation circuitry stores the asynchronous signal for at least a first clock period to generate an input clock signal. Storing the input asynchronous signal for a time period defined by the first clock in the first clock domain acts to synchronise any changes to the first clock period. Hence, the synchronisation circuitry helps ensure predictable and stable behaviour when generating the timeout signal.

In some configurations the synchronisation circuitry comprises a plurality of latch circuits arranged in series with one another and clocked using the first clock signal. The plurality of latches being arranged in series means that, for two consecutive latch circuits, the output of a first one of the two consecutive latch circuits is provided as an input to a second one of the two consecutive latch circuits. The provision of a first latch causes the asynchronous input signal to be latched and to change on a time period defined by the first clock signal. Whilst the output of the first latch may be a metastable value, this will not propagate past the second latch because of the additional one clock cycle delay that is present between the first latch and the second latch.

In some configurations the delay loop comprises invertor circuitry configured to invert one of the input clock generating signal and the output clock generating signal. The delay loop therefore behaves as a ring oscillator with a single NOT gate (invertor circuitry) and a series of latches arranged to move the oscillating signal between the first clock domain and the second clock domain. In some configurations, a plurality of NOT gates connected in series with one another may be provided. In general, the total number of NOT gates (invertor circuits) will be an odd number to ensure that the oscillator does not reach a stationary equilibrium. In some alternative configurations, the delay loop implemented by the apparatus may omit the NOT gate and the NOT gate may be included in the portion of the delay loop provided in the second clock domain.

In some configurations the control circuitry is configured to perform a comparison of each of a plurality of items of first data generated by the first processing circuitry against a corresponding one of a plurality of items of second data received from the second processing circuitry, each of the plurality of items of second data received through a different communication channel, wherein the control circuitry is configured for each comparison to issue a corresponding indication when that comparison does not match within the timeout clock period. The first processing circuitry and the second processing circuitry may each be configured to generate a plurality of items of data that are to be compared in order to ensure correct functionality of each of the processing circuits. The control circuitry may be configured to issue a corresponding indication, for each of the plurality of first and second data items, whether a corresponding pair of the first and second data items are equal to one another within the timeout clock period. The corresponding indication may be a same indication issued independent of which correspond pair of first and second data items triggered the indication. Alternatively, the corresponding indication may identify the pair of first and second data items that did not match.

Whilst a separate timeout signal may be provided for each corresponding set of first data and second data, in some configurations the control circuitry is configured to perform the comparison for each of the plurality of items of first data based on a same clock signal generated by the timeout period generation circuitry. The provision of a same clock signal as the timeout clock signal for each of the plurality of items of first data, the total amount of circuitry can be greatly reduced compared to, for example, providing separate timeout clock signal generation circuitry for each of the plurality of first data items.

The timeout signal may be generated directly from the delay loop. For example, the timeout signal may be a value of the delay loop taken at an output from one or more of the latch circuits. However, in some configurations the timeout period generation signal comprises comparison circuitry configured to output the timeout clock signal based on a comparison of the input clock generating signal against the output clock generating signal. The timeout clock signal is therefore derived from the input clock generating signal and the output clock generating signal. This approach may be used to cause the timeout clock signal to be in one of the high state or the low state for an amount of time dependent only on the clock signal in that clock domain.

In some configurations the timeout period generation circuitry is configured to delay the input clock generating signal using latch circuitry updated in response to the first clock signal; and the comparison circuitry is configured to compare the input clock generating signal at an input of the latch circuitry against the output clock generating signal at an output of the latch circuitry. The output clock generating signal at the output of the latch circuitry corresponds to the input clock generating signal at the input of the latch circuitry delayed by one first clock cycle in the first clock domain. When the input to the latch circuitry changes from one logical value to another logical value, the input and the output of the latch circuitry will differ from one another for a single clock cycle. By generating the timeout clock signal based on a comparison of these two inputs, and taking a first value when the two inputs are different, the timeout clock signal can be generated as having a first value for the first clock period and that is low for a period determined by the delay loop. The gap between rising edges of the timeout clock signal is therefore indicative of both the first clock period and the second clock period.

Whilst in some configurations the first processing circuitry may only interact with one other set of processing circuitry, i.e., the second processing circuitry, in some configurations the first processing circuitry is configured to interact with a plurality of processing circuitries each operating in a different clock domain, the plurality of processing circuitries comprising the second processing circuitry; and the apparatus comprises a plurality of timeout period generation circuitries comprising the timeout period generation circuitry, each of the plurality of timeout period generation circuitries configured to interact with a corresponding one of the plurality of processing circuitries and each configured to generate a corresponding timeout clock signal. In some configurations a timeout signal may be generated for all possible combinations of circuits that interact with one another. For example, where three sets of processing circuitry interact with one another, a first timeout signal may be generated based on the first and second processing circuitry, a second timeout signal may be generated based on the second and third processing circuitry, and a third timeout signal may be generated based on the third and first processing circuitry. However, in some configurations there may be one or more pairs of processing circuits that do not interact with one another. In such configurations timeout signals may only be generated for those processing circuitries that interact with one another.

In some configurations the first clock signal and the second clock signal are asynchronous with one another. In some configurations the first clock period and the second clock signal are different from one another. In alternative configurations, the first clock period and the second clock period may be the same but may be out of phase with one another.

The apparatus may be provided without the second processing circuitry, i.e., the apparatus is provided with circuitry suitable for allowing it to interact with second processing circuitry that may be provided, e.g., at a later stage by a different designer or manufacturer. However, in some configurations the apparatus comprises the second processing circuitry, wherein: the timeout period generation circuitry is first timeout period generation circuitry associated with the first processing circuitry; and the apparatus comprises second timeout period generation circuitry associated with the second processing circuitry and configured to generate a second output clock generating signal for the second processing circuitry. Each of the first clock domain and the second clock domain may be provided with its own timeout period generation circuitry. Whilst each of the first and second timeout period generation circuits generates a timeout clock signal that is based on the combination of the first clock period and the second clock period, the first and second timeout period generation circuits may each produce a different signal according to the clock signal in that clock domain.

In some configurations the first processing circuitry and the second processing circuitry are configured to operate in lockstep with one another. In such configurations, having an accurately generated timeout period improves the efficiency of comparisons between the first processing circuitry and the second processing circuitry.

In some configurations the first processing circuitry and the second processing circuitry are implemented on a same chip. In some configurations the first processing circuitry and the second processing circuitry are implemented on separate chips.

Particular configurations will now be described with reference to the figures.

In general, where two clock domains are provided that are required to exchange data at a given time, the variation in the clock signal may result in data being received within a window of time where the duration of the window of time is based on the difference in clock frequencies and phases in each of the two clock domains. Assuming that the maximum and minimum frequencies that the different clock domains are able to operate at are defined as $F_{max}$ and $F_{min}$ respectively, and there is a temporal delay of TD clock cycles for a signal to cross a clock domain boundary, then the number of clock cycles required to ensure that a signal will be provided to a clock domain and propagated across the boundary for that clock domain will be equal to $N_{clock} = F_{max}$ (TD+1)/$F_{min}$. The number of bits provided in a counter that is required to ensure that the number of clock cycles $N_{clock}$ can be counted in order to measure the time from data being provided in the first clock domain to a latest time at which data from the second clock domain is expected, is equal to $clog_2$ ($N_{clock}$), where $clog_2$ ($N_{clock}$) is defined as the ceiling of the logarithm of base 2 of $N_{clock}$, i.e., the logarithm of base 2 of $N_{clock}$ round up to the next integer. Hence, for a case where two clock domains are designed to a design criteria specifying a maximum clock ratio of 20 ($F_{max}/F_{min}$=20), and with a temporal delay of 2 clock cycles (TD=2), the number of clock cycles is equal to 60, which would require a 6-bit counter. Such a 6-bit counter could be implemented for each signal being propagated between the second clock domain and the first clock domain. When the first data from the first processing circuitry is received, the 6-bit counter could be started and if the second data from the second clock domain does not equal the first data from the first clock domain by the time the 6-bit counter has saturated (or has reached a value of 60), then the control circuitry will signal a mismatch. This approach would require a number of 6-bit counters to be provided at clock domain crossings resulting in wasted circuit area and power.

FIG. 1 illustrates an apparatus 10 according to some configurations of the present techniques that provides an alternative approach to ensuring sufficient time is provided at clock domain crossings. The apparatus 10 comprises a first clock domain 12 and a second clock domain 14. The first clock domain is provided with first processing circuitry 16, control circuitry 18, and timeout period generation circuitry 20. The second clock domain is provided with second processing circuitry 22. The first clock domain 12 generates a first clock signal that operates with a first clock period. The first processing circuitry 16 operates at a frequency determined by the first clock signal, i.e., the first processing circuitry 16 is clocked by the first clock period. The second clock domain 14 generates a second clock signal with a second clock period. The second processing circuitry 22 operates at a frequency determined by the second clock signal, i.e., the second processing circuitry 22 is clocked by the second clock period. The first clock signal and the second clock signal are asynchronous with one another. This may be a result of both the first clock signal and the second clock signal being generated by different circuitry, having a different frequency and/or phase.

The first processing circuitry 16 and the second processing circuitry 22 are configured to perform at least some operations that are in lockstep with one another such that the results for some of the processing operations performed by the first processing circuitry 16 and the second processing circuitry 22 are arranged to be the same operations performed at the same time and producing a same result. The results from the first processing circuitry 16 and the second processing circuitry 22 are fed to the control circuitry 18 to be compared, for example, for the purpose of checking accuracy or to provide redundancy. The control circuitry 18 receives the results from the first processing circuitry 16 and the second processing circuitry 22 and compares the results. If the results are not the same as one another within a timeout window, then the control circuitry 18 is configured to indicate the mismatch. The indication may be provided in the form of an exception, an interrupt, or by recording the mismatch, e.g., in a file, to be reviewed at a later stage. The duration of the timeout window is defined by a timeout clock signal which is generated by the timeout period generation circuitry 20. The timeout period generation circuitry 20 generates the timeout clock signal based on the first clock signal that is provided within the first clock domain 12 and based on information indicative of the second clock period which is provided to the timeout period generation circuitry 20 from the second clock domain 14. Because the timeout period generation circuitry 20 is provided with information indicative of both the first clock period and the second clock period, the timeout clock signal is able to account for any variable delay that may be provided as a result of the asynchronous clock domains.

Figure 2:
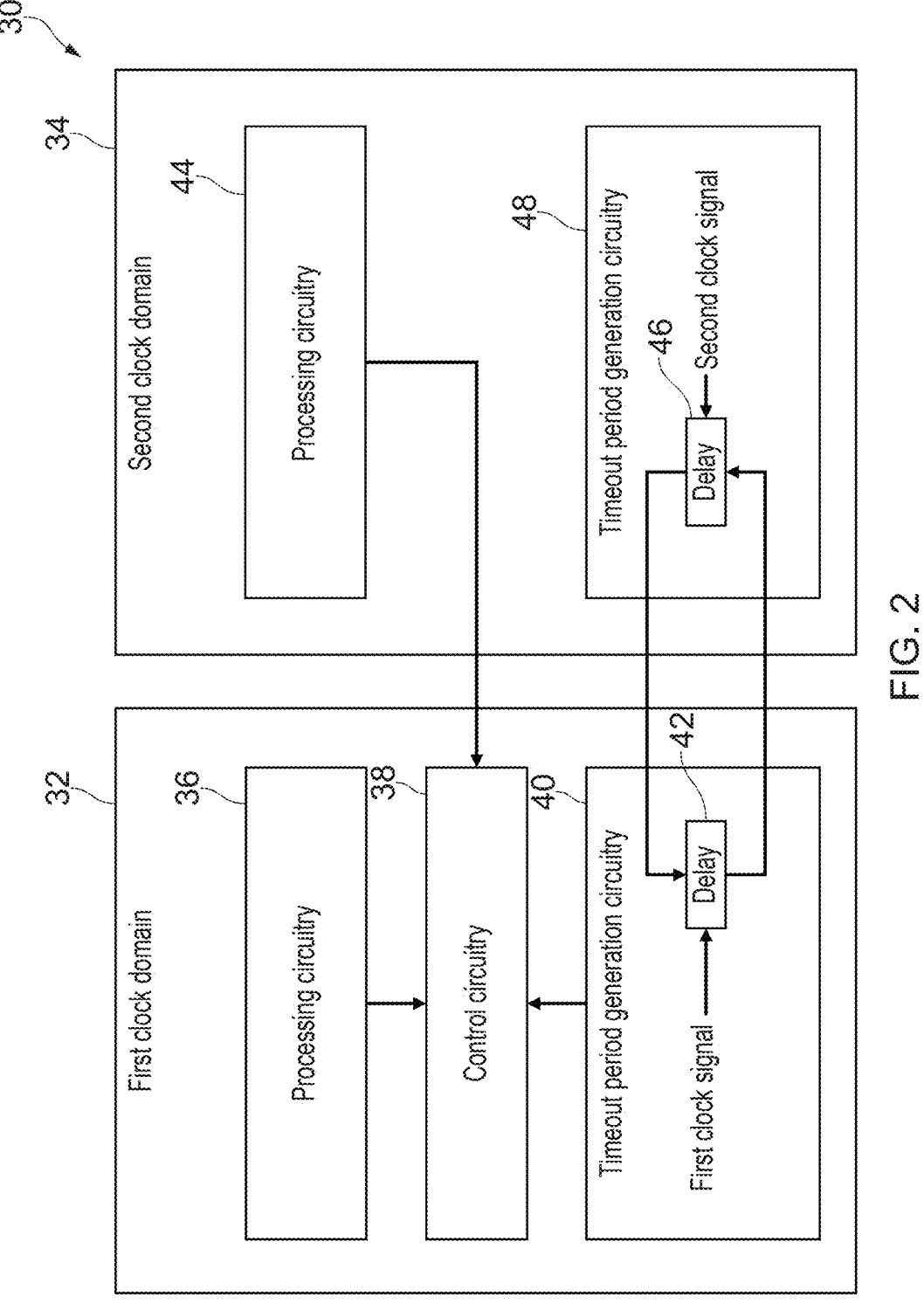
FIG. 2 schematically illustrates an apparatus according to some configurations of the present techniques.

FIG. 2 schematically illustrates an apparatus 30 according to some configurations of the present techniques. The apparatus 30 comprises a first clock domain 32 and a second clock domain 34. The first clock 32 domain comprises first processing circuitry 36 and the second clock 34 domain comprises second processing circuitry 44. The first clock domain 32 is also provided with control circuitry 38 configured to determine if first data provided by the first processing circuitry 36 and second data provided by the second processing circuitry 44 are in agreement with one another within a timeout period generated based on a timeout clock signal. The first clock domain 32 is provided with timeout period generation circuitry 40, and the second clock domain 34 is provided with second timeout period generation circuitry 48. The first timeout period generation circuitry 40 and the second timeout period generation circuitry 48 couple to one another to implement a delay loop. The delay loop comprises first delay circuitry 42 that is comprised in the first timeout period generation circuitry 40 and second delay circuitry 46 that is comprised in the second timeout period generation circuitry 48. A signal is sent from the first delay circuitry 42 to the second delay generating circuitry 46. The second delay generating circuitry 46 receives the signal sent from the first delay generating circuitry 42 and delays that signal by a second clock period. The second delay generating circuitry 46 then sends the delayed signal back to the first delay circuitry 42. The first delay circuitry 42 receives the delayed signal and adds a further delay of a first clock period before the signal is sent back to the second delay circuitry 46. The signal is therefore routed round the delay loop between the first clock domain 32 and the second clock domain 34. On each iteration a delay based on the first clock signal is added in the first clock domain 32 (e.g. by the first delay circuitry 42 comprised in the first timeout period generation circuitry 40) and a delay based on the second clock signal is added in the second clock domain 34 (e.g. by the second delay circuitry 46 comprised in the second timeout period generation circuitry 46). Hence, a round trip time for the signal is comprised of the delay times associated with the first delay circuitry 42 and the second delay circuitry 46. As a result, a timeout signal can be generated from the signal by the first timeout period generation circuitry 40. The timeout signal can then be passed to the control circuitry 38.

Figure 3:
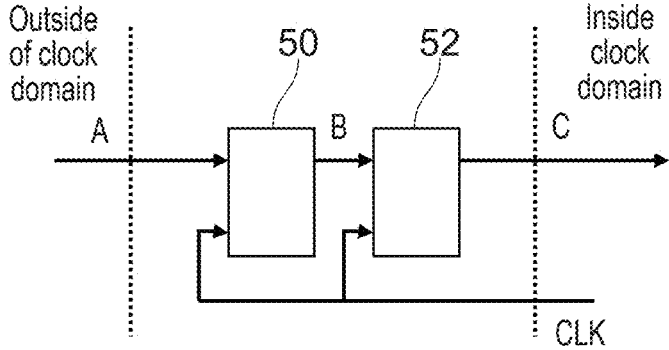
FIG. 3 schematically illustrates clock domains according to some configurations of the present techniques.
Figure 3:
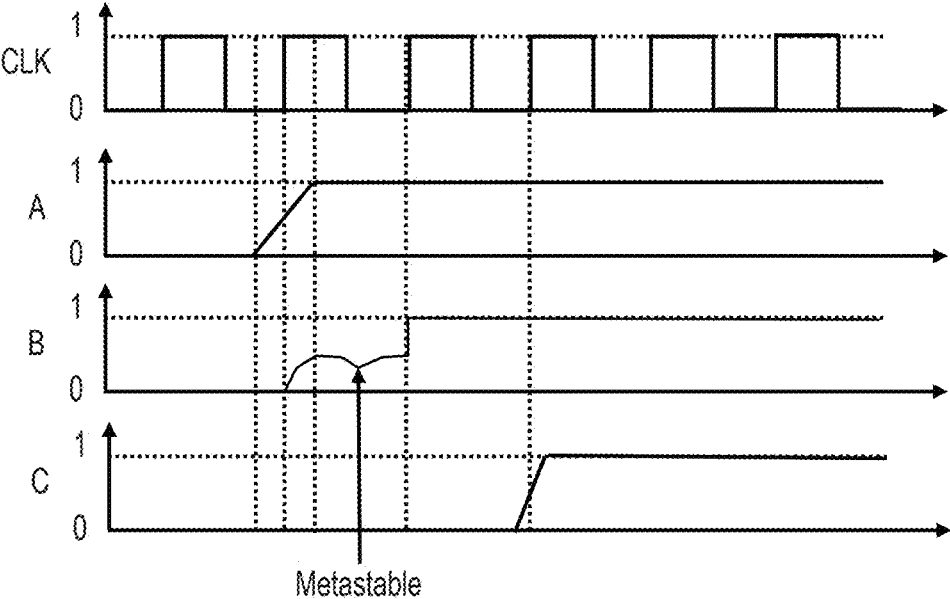

FIG. 3 schematically illustrates a clock domain crossing according to some configurations of the present technique. The clock domain crossing takes a signal (A) from outside of a clock domain and produces a signal (C) inside the clock domain. The clock domain crossing is facilitated by two latch circuits that are clocked according to a clock from within the clock domain. The signal (A) is received by a first latch circuit 50 which updates its output value (B) on each rising edge of the clock signal (CLK). The output value B from the first latch circuit 50 is passed as an input to a second latch circuit 52 which updates its output value (C) on each rising edge of the clock signal (CLK). A single received at input (A) will therefore take two clock cycles to propagate from outside the clock domain to inside the clock domain.

The purpose of the first latch 50 and the second latch 52 is illustrated in the lower half of FIG. 3 which illustrates the clock signal along with a corresponding signal at points (A), (B), and (C). If the signal (A) changes with a timing such that it is always at steady state on a rising edge of a clock, then the latches will act to delay the signal (A) by two clock cycles. However, and as illustrated, if signal (A) changes from low (logical 0) to high (logical 1) as a rising edge of the clock signal is received, e.g., the transition on signal (A) is too close to the clock edge, then the output B of the first latch 50 (the input of the second latch 52) may be in a metastable state. The output (B) may oscillate for some time before it settles down. If such data were allowed to propagate into the clock domain, then this may lead to unstable operation of processing circuitry in that clock domain. The provision of the second latch 52 allows for a sufficient time to pass before that signal is propagated to within the clock domain. As a result, the output (C) remains in a stable state. The first latch 50 and the second latch 52, which are clocked by the clock within the clock domain, therefore act to ensure that data entering the clock domain is stable.

Figure 4:
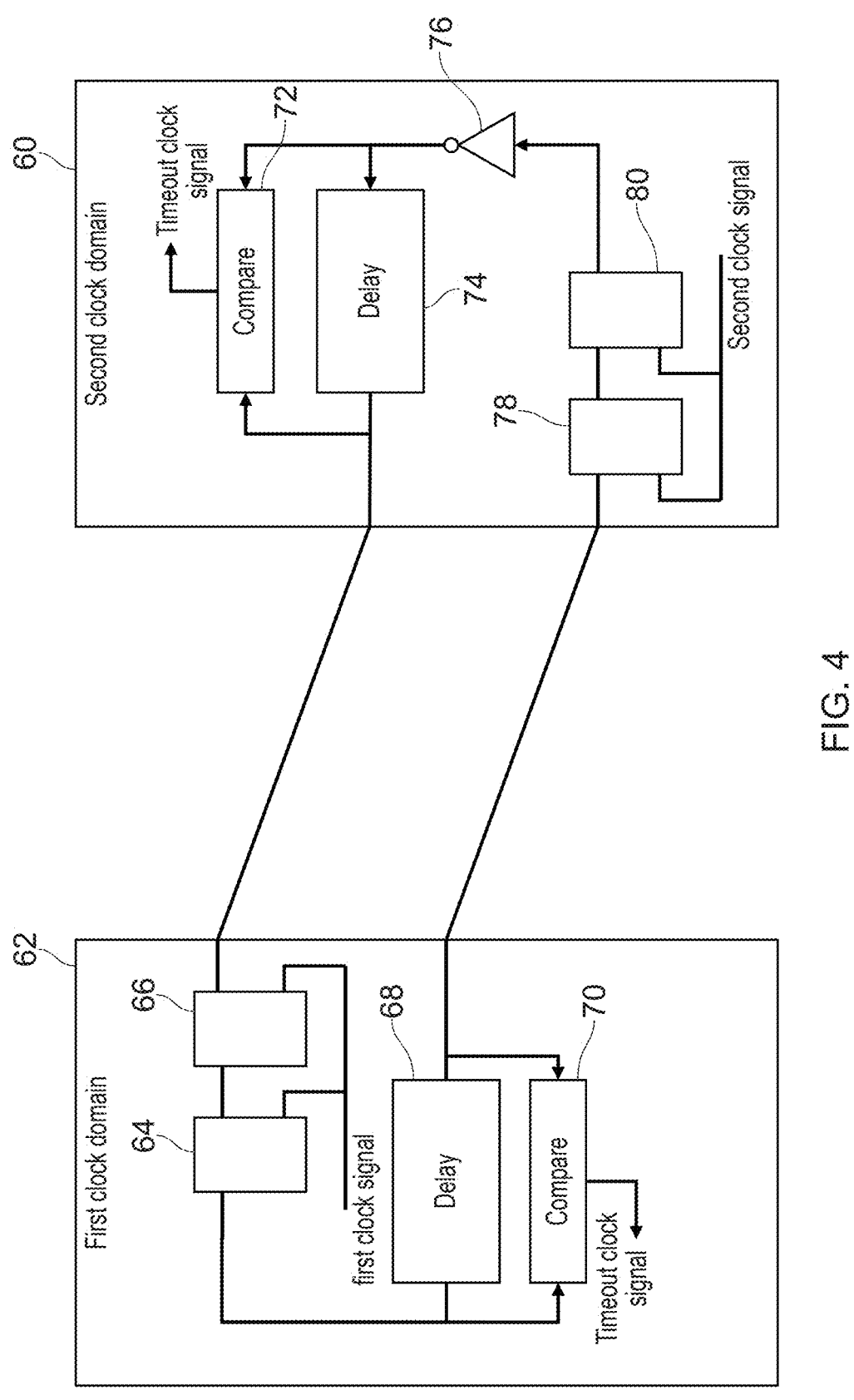
FIG. 4 schematically illustrates an apparatus according to some configurations of the present techniques.

FIG. 4 schematically illustrates the use of latch pairs as part of a delay loop to ensure that the signals used to generate the timeout clock signals in a first clock domain 62 and a second clock domain 60 are based on stable signals that have correctly entered the respective clock domains. The first clock domain is provided with a first latch 66 and a second latch 64. The first latch 66 and the second latch 64 are both clocked by the first clock signal within the first clock domain. The output of the second latch 64 is provided as an input to first delay circuitry 68 which generates a delay according to the first clock signal. The output of the first delay circuitry 68 within the first clock domain is passed to the second clock domain 60 where the signal is fed through first latch circuitry 78 and second latch circuitry 80 which are both clocked by the second clock signal in the second clock domain 60. The output of the second clock signal is fed to an inverter 76 which inverts the signal before the signal is fed into the second delay circuitry 74 and back to the first clock domain 62.

The first latch circuitry 66 and the second latch circuitry 64 in the first clock domain 62 ensure that the signal fed to the first delay circuitry 68 is stable. The first latch circuitry 78 and the second latch circuitry 80 in the second clock domain 60 ensure that the signal fed to the inverter (and subsequently to the second delay circuitry 74) is stable. The inverter 76 is provided to invert the signal and, acts to implement a ring oscillator that passes through the first clock domain 62 and the second clock domain 76. The period of the ring oscillator will therefore be determined by the delay imposed by the first latch 66 and the second latch 64 in the first clock domain 62, the first delay circuitry 68, the first latch 78 and the second latch 80 in the second clock domain 60, the second delay circuitry 74, and any intrinsic delays associated with the inverter 76 and the communication pathways between the first clock domain and the second clock domain.

The signals at the input and the output to the first delay circuitry 68 are fed into comparison circuitry 70 that generates a timeout clock signal based on the difference between these signals. Hence, over the time period in which the input to the first delay circuitry 68 and the output from the first delay circuitry 68 are different from one another the comparison circuitry outputs a first value for the timeout clock signal, and outputs a second value, different from the first value, when the input to the first delay circuitry 68 and the output from the first delay circuitry 68 are the same as one another. As a result, the first clock domain generates a pulse that has an overall period defined by the combination of delays present in the first clock domain 62 and the second clock domain 60 but that takes the first value for a period of time that is defined by the first delay circuitry 68.

The signals at the input and the output to the second delay circuitry 74 are fed into comparison circuitry 72 that generates a timeout clock signal based on the difference between these signals. Hence, over the time period in which the input to the second delay circuitry 70 and the output from the second delay circuitry 70 are different from one another the comparison circuitry outputs a first value for the timeout clock signal, and outputs a second value, different from the first value, when the input to the second delay circuitry 72 and the output from the second delay circuitry 72 are the same as one another. As a result, the second clock domain generates a pulse that has an overall period defined by the combination of delays present in the first clock domain 62 and the second clock domain 60 but that takes the first value for a period of time that is defined by the second delay circuitry 72.

It will be readily apparent to the person of ordinary skill in the art that the inverter 76 could be provided in either the first clock domain 62 or the second clock domain 60 and may be provided either before or after the respective delay circuitry within that clock domain. Furthermore, whilst both the first clock domain 62 and the second clock domain 60 in FIG. 4 are illustrated as generating a timeout clock signal, in some configurations only the first clock domain may generate a timeout clock signal and the comparison circuitry 72 in the second clock domain 60 may be omitted.

Figure 5:
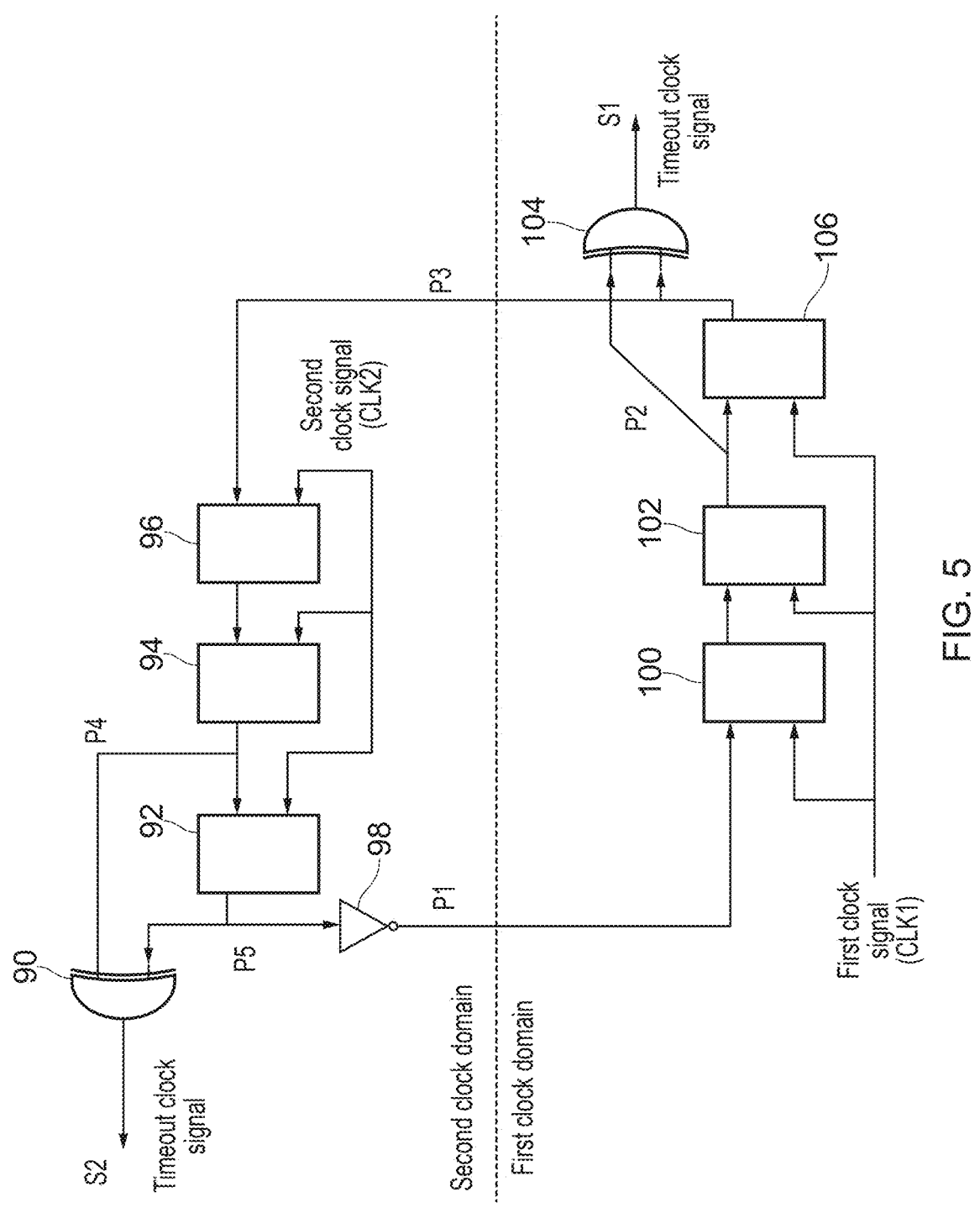
FIG. 5 schematically illustrates a first clock domain and a second clock domain according to some configurations of the present techniques.

FIG. 5 schematically illustrates a first clock domain and a second clock domain according to some configurations of the present techniques. The first clock domain and the second clock domain are coupled to one another to form a delay loop that generates a timeout clock signal in the first clock domain and a timeout clock signal in the second clock domain. In the first clock domain, the delay loop comprises a first latch circuit 100, a second latch circuit 102, and a third latch circuit 106 coupled to one another in series and clocked using a first clock signal. The latch circuits in the first clock domain may each comprise a D type flip flop. The first latch circuit 100 and the second latch circuit 102 in the first clock domain act to ensure that the signal received in the first clock domain is stable (as described in relation to FIG. 3). The third latch circuit 106 in the first clock domain acts as the delay circuit and implements a delay equal to one cycle of the first clock signal. The output from the third latch circuit 106 is fed from the first clock domain to the second clock domain. In the second clock domain, the delay loop comprises a first latch circuit 96, a second latch circuit 94, and a third latch circuit 92 coupled to one another in series and clocked using a second clock signal. As in the first clock domain, the latch circuits in the second clock domain may each comprise a D type flip flop. The first latch circuit 96 and the second latch circuit 94 in the second clock domain act to ensure that the signal received in the second clock domain is stable (as described in relation to FIG. 3). The third latch circuit 92 in the second clock domain acts as a delay circuit and implements a delay equal to one cycle of the second clock signal. The output of the third latch circuit 92 in the second clock domain is fed to the inverter 98 before being passed from the second domain back to the first clock domain to complete the delay loop. The inverter 98 in the delay loop causes the delay loop to behave like a ring oscillator.

The timeout clock signal in the first clock domain is generated using an EXOR gate (exclusive OR gate) 104 which takes, as inputs, the input into the third latch circuit 106 in the first clock domain and the output from the third latch circuit 106 in the first clock domain. The timeout clock signal that is output by the EXOR gate 104 in the first clock domain is therefore high (logical one) when the input to and the output from the third latch circuit 106 in the first clock domain are different from one another. Hence, when the input to the third latch circuit in the first clock domain changes from one logical state to another (either logical zero to logical one, or logical one to logical zero), the inputs to the EXOR gate 104 in the first clock domain will be different from one another and the timeout clock signal (the output from the EXOR gate 104) will be high. Otherwise, the inputs to the EXOR gate 104 in the first clock domain will be the same as one another and the timeout clock signal will be low.

The timeout clock signal in the second clock domain is generated using an EXOR gate (exclusive OR gate) 90 which takes, as inputs, the input into the third latch circuit 92 in the second clock domain and the output from the third latch circuit 92 in the second clock domain. The timeout clock signal that is output by the EXOR gate 90 in the second clock domain is therefore high (logical one) when the input to and the output from the third latch circuit 92 in the second clock domain are different from one another. Hence, when the input to the third latch circuit in the second clock domain changes from one logical state to another (either logical zero to logical one, or logical one to logical zero), the inputs to the EXOR gate 90 in the second clock domain will be different from one another and the timeout clock signal (the output from the EXOR gate 90) will be high. Otherwise, the inputs to the EXOR gate 104 in the second clock domain will be the same as one another and the timeout clock signal will be low.

Figure 6:
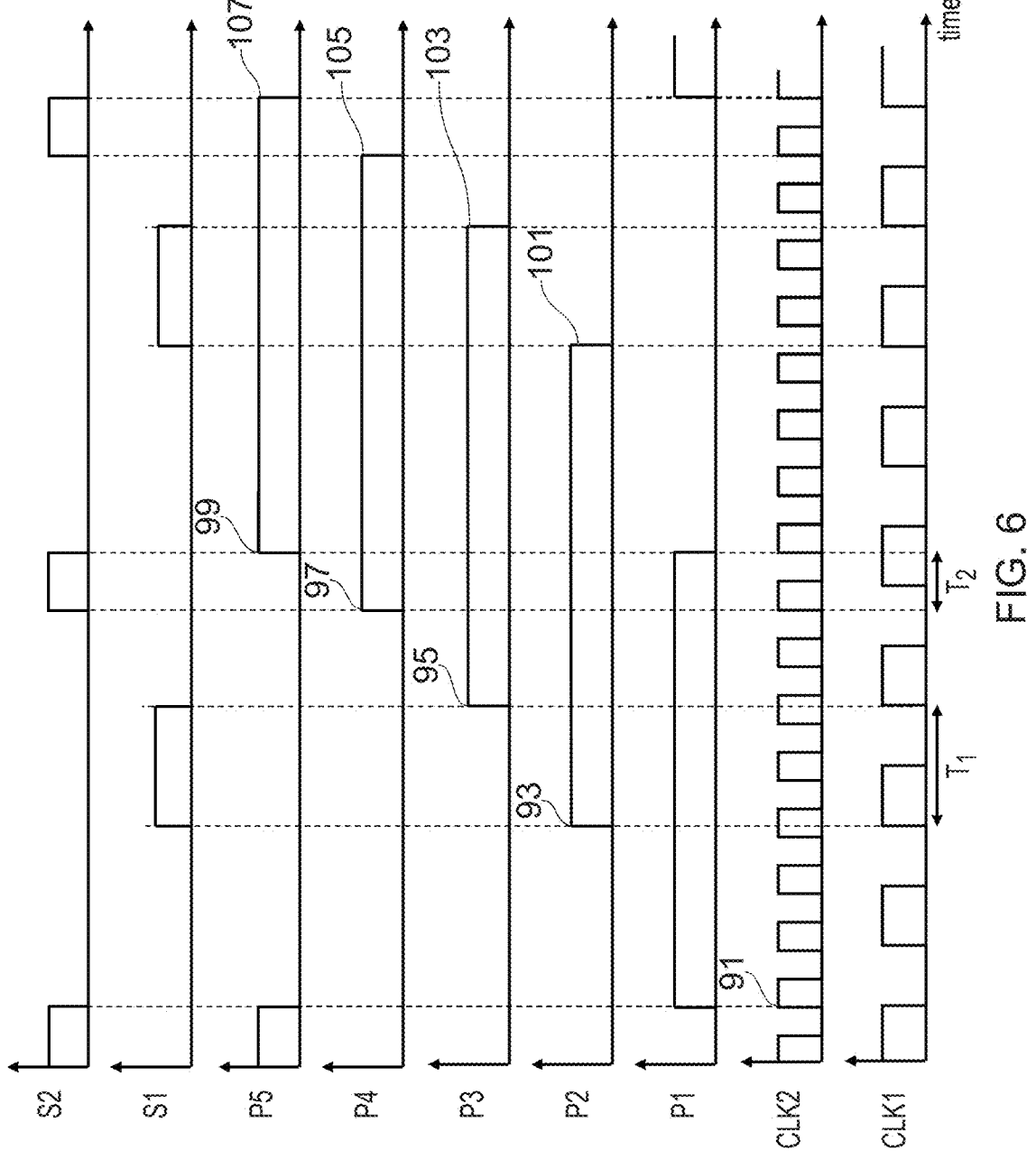
FIG. 6 schematically illustrates timing of signals according to some configurations of the present techniques.

FIG. 6 schematically illustrates a timing of the signals at points P1 to P5, S1, S2, CLK 1 and CLK 2 as illustrated in FIG. 5. In the illustrated example, CLK1 has period $T_1$ and CLK 2 has period $T_2$ where $T_1$ is greater than $T_2$. Signal P1 is the output of the invertor 98 and is equal to the inverse of the signal P5 which is present at the input to the invertor. The horizontal axis (x axis) of the graphs shows time and the vertical axis (y axis) of the graphs shows the logical state of the signals (either low or high). The output of the invertor P1 is shown to switch from low to high at a time point 91 coinciding with the rising edge of CLK2. Signal P1 is output from the second clock domain to the first clock domain where it is fed through the first latch 100 and the second latch 102 in the first clock domain. The signal at P2, the output of the second latch circuit 102 in the first clock domain, is therefore the signal at P1 delayed by two cycles of the first clock signal CLK1 and is seen to go from low to high at time point 93. The signal P2 output from the second latch circuit 102 in the first clock domain is then fed into the third latch circuit 106 in the first clock domain. The output of the third latch circuit 106 in the first clock domain is signal P3 which is equal to signal P2 delayed by one cycle of the first clock signal CLK1. Hence, signal P3 goes from low to high at time point 95 in response to signal P2 switching from low to high at time point 93.

The signal P3 is fed from the first clock domain to the second clock domain where it passes through the first latch circuit 96 and the second latch circuit 94 in the second clock domain. The output P4 of the second latch circuit in the second clock domain therefore switches from low to high in response to signal P3 switching from low to high but with a delay of two cycles of the second clock signal CLK2. Hence, P4 switches from low to high at a time point 97. Because T₂ is less that T₁ the time difference between time point 97 and time point 95 is smaller than the time difference between time point 93 and time point 91 (the equivalent time points for that part of the cycle in the first clock domain). The signal P4 output from the second latch circuit 94 in the second clock domain is then fed into the third latch circuit 92 in the second clock domain. The output of the third latch circuit 92 in the second clock domain is signal P5 which is equal to signal P4 delayed by one cycle of the second clock signal CLK2. Hence, signal P5 goes from low to high at time point 99 in response to signal P4 switching from low to high at time point 97. As signal P1 is the inverse of signal P5, the signal P1 drops from high to low at time point 99 and the high to low transition propagates round the delay loop in the same manner as described in relation to the low to high transition.

The signal S1 (i.e., the timeout clock signal in the first clock domain) is equal to the EXOR of signals P2 and P3. Hence, S1 is high when P2 is not equal to P3, i.e., between time points 93 and 95 for the low to high transition on the delay loop, and between time points 101 and 103 for the high to low transition on the delay loop. As a result, the signal S1 is high for a time period equal to T₁ and is low for a time period of 3T₁. The signal S2 (i.e., the timeout clock signal in the second clock domain) is equal to the EXOR of signals P4 and P5. Hence, S2 is high when P4 is not equal to P5, i.e., between time points 97 and 99 for the low to high transition on the delay loop, and between time points 105 and 107 for the high to low transition on the delay loop. As a result, the signal S2 is high for a time period equal to T₂ and is low for a time period of 7T₂. It is noted that the period for each of S1 and S2 will always be greater than the sum of T₁ and T₂. Hence, the timeout period clock signals are calculated taking into account the first clock signal and the second clock signal.

It will be readily apparent to the skilled person that alternative comparator logic, other than the EXOR gate 90 in the second clock domain and the EXOR gate 104 in the first clock domain may be provided in some configurations. For example, the comparator circuitry in the first clock domain could be configured to output a logical 1 in response to P2 being high and P3 being low, and otherwise to output a logical 0. Similarly, the comparator logic in the first clock domain could be configured to output a logical 1 in response to P4 being high and P5 being low, and otherwise to output a logical 0.

Figure 7:
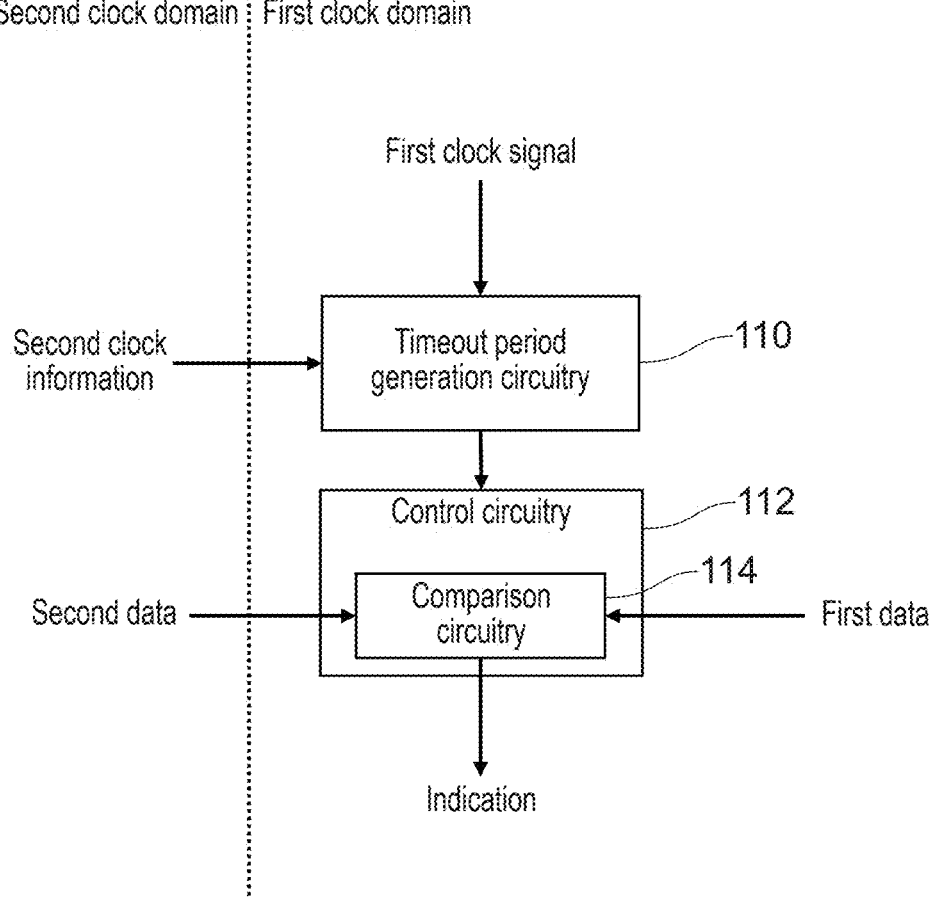
FIG. 7 schematically illustrates timeout period generation circuitry according to some configurations of the present techniques.

FIG. 7 schematically illustrates the comparison of first data and second data by control circuitry 112 in a first clock domain. The first clock domain is provided with timeout period generation circuitry 110. As discussed, the timeout period generation circuitry 110 generates a timeout clock signal and may be arranged, for example, according to any of the examples discussed above. In particular, the timeout period generation circuitry 110 may generate the timeout clock signal using a delay loop or based on data received identifying a clock frequency of the second clock from the second clock domain. The timeout clock signal is provided to the control circuitry 112 which also receives first data from the first clock domain and second data from the second clock domain. The first data and the second data are fed into comparison circuitry 114 within the control circuitry 112. The comparison circuitry 114 determines whether the first data and the second data are equal to one another within the period of the timeout signal (e.g., between two rising edges of the timeout signal, or between an integer number of edges of the timeout signal). The comparison circuitry 114 outputs an indication in the event of a mismatch between the first data and the second data.

Figure 8:
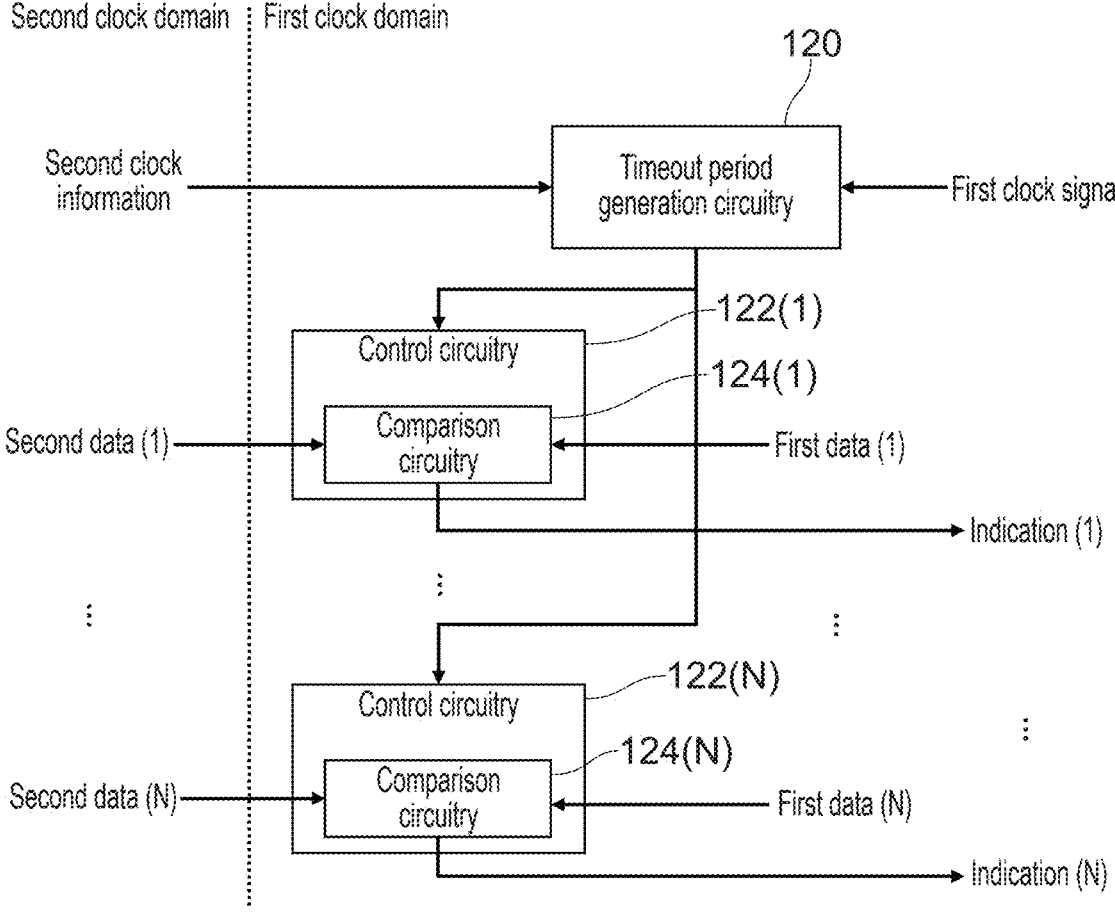
FIG. 8 schematically illustrates timeout period generation circuitry according to some configurations of the present techniques.

FIG. 8 schematically illustrates a further example of the comparison between data in the first clock domain. As in FIG. 7, the first clock domain is provided with timeout period generation circuitry 120. As discussed, the timeout period generation circuitry 120 generates a timeout clock signal and may be arranged, for example, according to any of the examples discussed above. In particular, the timeout period generation circuitry 120 may generate the timeout clock signal using a delay loop or based on data received identifying a clock frequency of the second clock from the second clock domain. The timeout clock signal is provided to a plurality of instances of control circuitry 122(1) to 122(N), where N is an integer. Each instance of control circuitry 122 is provided with comparison circuitry 124. Each instance of the control circuitry 122 is configured to receive first data from the first clock domain and second data from the second clock domain and to provide an indication in the event of a mismatch between the first data and the second data within a timeframe defined by the timeout signal (e.g., between two rising edges of the timeout signal, or between an integer number of edges of the timeout signal). For example, the timeout clock signal is provided to the control circuitry 122(1) which also receives first data (1) from the first clock domain and second data (1) from the second clock domain. The first data (1) and the second data (1) are fed into comparison circuitry 124(1) within the control circuitry 122(1). The comparison circuitry 124(1) determines whether the first data (1) and the second data (1) are equal to one another within the period of the timeout signal (e.g., between two rising edges of the timeout signal, or between an integer number of edges of the timeout signal). The comparison circuitry 124(1) outputs an indication (1) in the event of a mismatch between the first data (1) and the second data (1). Similarly, the timeout clock signal is provided to the control circuitry 122(N) which also receives first data (N) from the first clock domain and second data (N) from the second clock domain. The first data (N) and the second data (N) are fed into comparison circuitry 124(N) within the control circuitry 122(N). The comparison circuitry 124(N) determines whether the first data (N) and the second data (N) are equal to one another within the period of the timeout signal (e.g., between two rising edges of the timeout signal, or between an integer number of edges of the timeout signal). The comparison circuitry 124(N) outputs an indication (N) in the event of a mismatch between the first data (N) and the second data (N).

Figure 9:
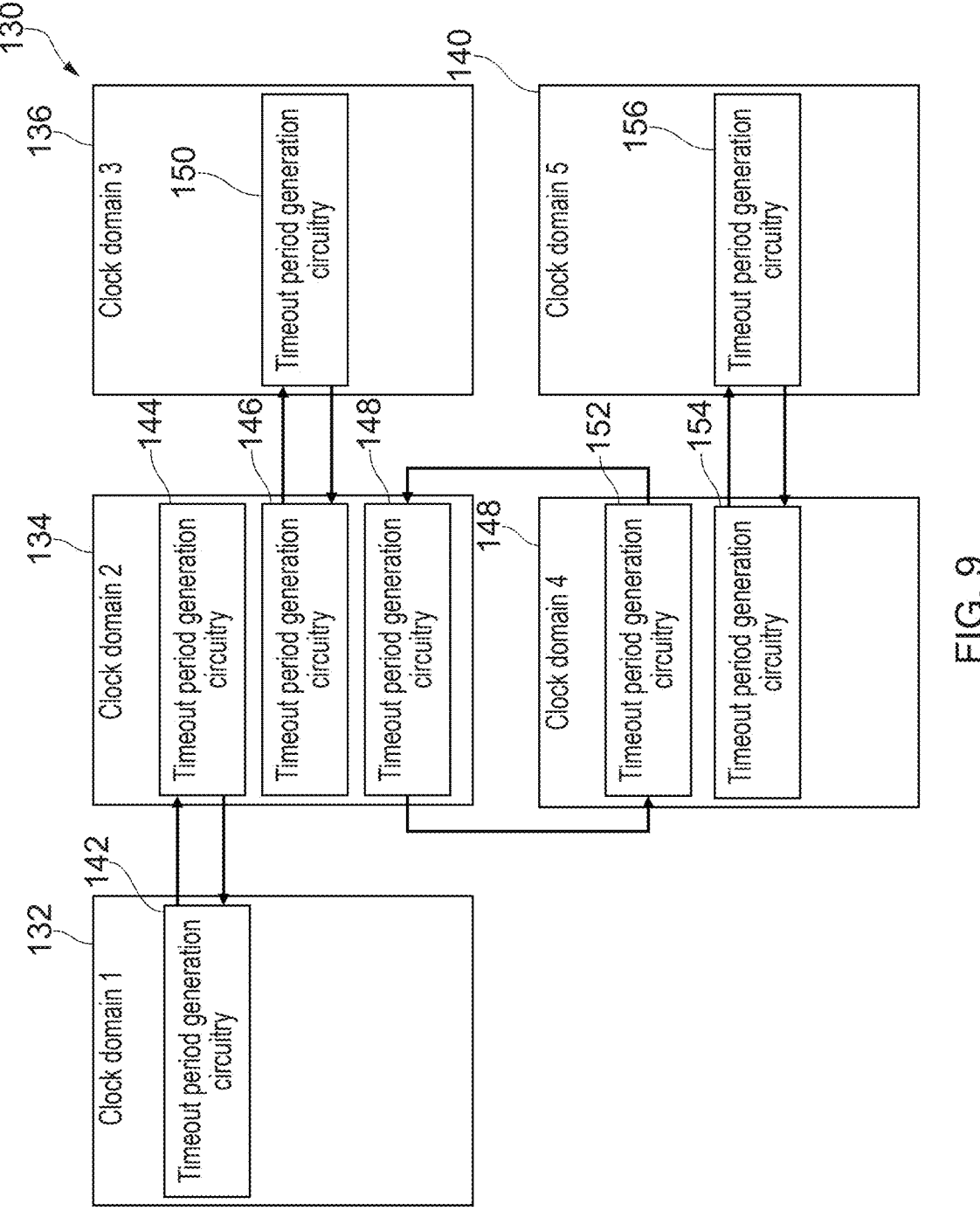
FIG. 9 schematically illustrates an apparatus according to some configurations of the present techniques.

FIG. 9 schematically illustrates an apparatus according to some configurations of the present techniques. The apparatus is provided with a plurality of clock domains. The plurality of clock domains comprises clock domain 1 132, clock domain 2 134, clock domain 3 136, clock domain 4 148, and clock domain 5 140. Each of the clock domains is provided with at least one instance of timeout period generation circuitry to allow that clock domain to couple to one or more other clock domains and to generate timeout signals appropriate for performing comparisons between data generated in that clock domain and the clock domain to which it is coupled.

Clock domain 1 132 is provided with timeout period generation circuitry 142 and is coupled to clock domain 2 134 via timeout period generation circuitry 144. Clock domain 1 132 is therefore able to generate a timeout clock signal appropriate for comparison of data with clock domain 2 134, and clock domain 2 134 is able to generate a timeout signal appropriate for comparison of data with clock domain 1 132.

In addition to the above described couplings, clock domain 2 134 is also provided with timeout period generation circuitry 146 which is coupled to clock domain 3 136 via timeout period generation circuitry 150. Clock domain 2 134 is therefore able to generate a timeout clock signal appropriate for comparison of data with clock domain 3 136, and clock domain 3 136 is able to generate a timeout signal appropriate for comparison of data with clock domain 2 134. Clock domain 2 is also provided with timeout period generation circuitry 148 and is coupled to clock domain 4 148 via timeout period generation circuitry 152. Clock domain 2 134 is therefore able to generate a timeout clock signal appropriate for comparison of data with clock domain 4 148, and clock domain 4 148 is able to generate a timeout signal appropriate for comparison of data with clock domain 2 136.

In addition to the above described couplings, clock domain 4 148 is also provided with timeout period generation circuitry 154 which is coupled to clock domain 5 140 via timeout period generation circuitry 156. Clock domain 4 148 is therefore able to generate a timeout clock signal appropriate for comparison of data with clock domain 5 140, and clock domain 5 140 is able to generate a timeout signal appropriate for comparison of data with clock domain 4 148.

It will be readily apparent to the skilled person that the couplings between clock domains illustrated in FIG. 9 are for illustrative purpose only and that further couplings between different ones of the clock domains may be provided. For example, each clock domain may be provided with timeout period generation circuitry for coupling to each other clock domain. Alternatively, one clock domain (e.g., clock domain 2 134) may be provided with timeout generation circuitry to couple to all other clock domains. Each of the other clock domains may couple only to the one clock domain (e.g., clock domain 2 134).

Figure 10:
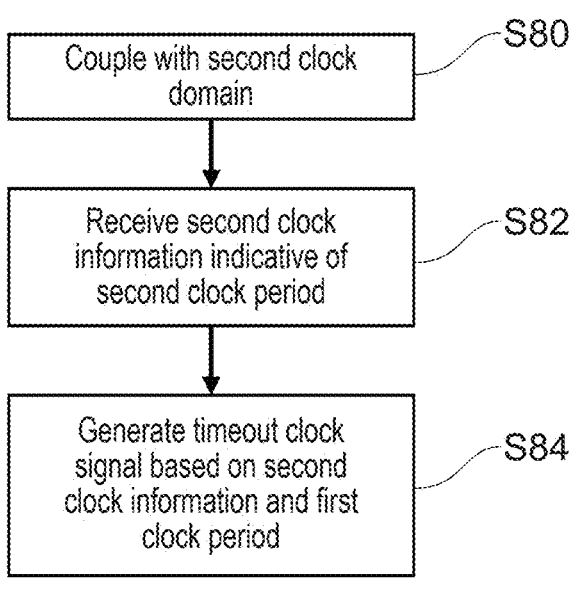
FIG. 10 schematically illustrates a sequence of steps carried out according to some configurations of the present techniques.

FIG. 10 schematically illustrates a sequence of steps carried out according to some configurations of the present techniques. Flow begins at step S80 where a first clock domain is coupled with a second clock domain. Flow then proceeds to step S82 where the first clock domain receives second clock information indicative of a second clock period in the second clock domain. Flow then proceeds to step S84 where a timeout clock signal is generated based on the first clock period and the second clock information. The timeout generation signal may then be used to determine a time window in which first data generated in the first domain and second data generated in the second domain may be compared to one another.

Concepts described herein may be embodied in a system comprising at least one packaged chip. The apparatus described earlier is implemented in the at least one packaged chip (either being implemented in one specific chip of the system, or distributed over more than one packaged chip). The at least one packaged chip is assembled on a board with at least one system component. A chip-containing product may comprise the system assembled on a further board with at least one other product component. The system or the chip-containing product may be assembled into a housing or onto a structural support (such as a frame or blade).

Figure 11:
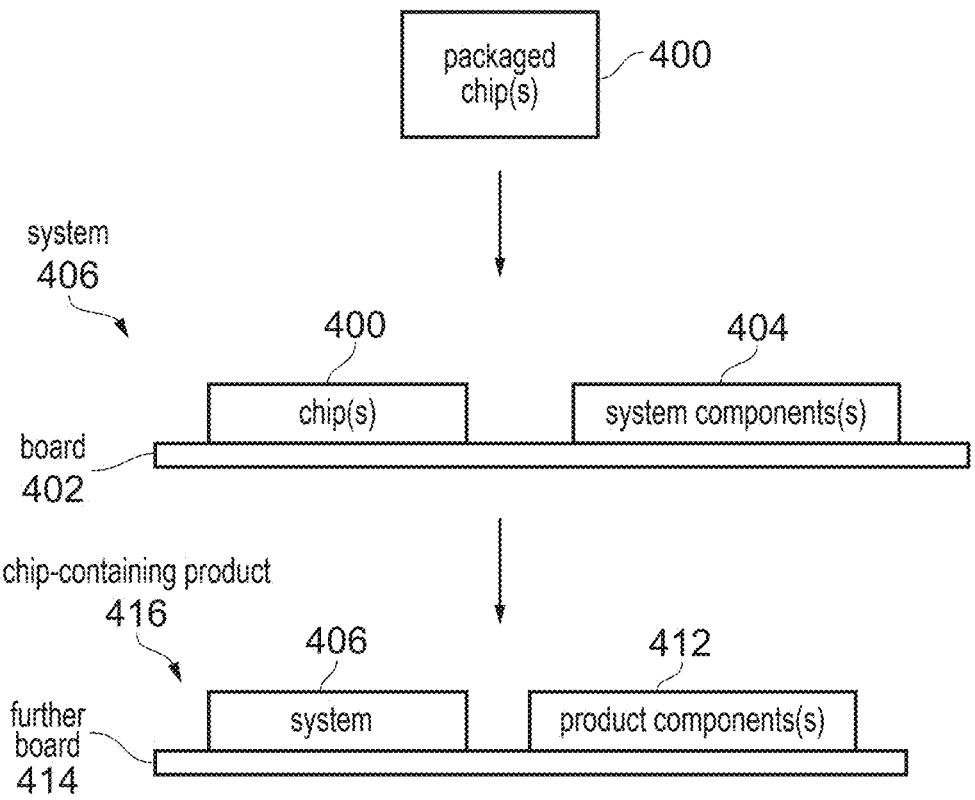
FIG. 11 schematically illustrates a system and a chip containing product according to some configurations of the present techniques.

As shown in FIG. 11, one or more packaged chips 400, with the apparatus described above implemented on one chip or distributed over two or more of the chips, are manufactured by a semiconductor chip manufacturer. In some examples, the chip product 400 made by the semiconductor chip manufacturer may be provided as a semiconductor package which comprises a protective casing (e.g. made of metal, plastic, glass or ceramic) containing the semiconductor devices implementing the apparatus described above and connectors, such as lands, balls or pins, for connecting the semiconductor devices to an external environment. Where more than one chip 400 is provided, these could be provided as separate integrated circuits (provided as separate packages), or could be packaged by the semiconductor provider into a multi-chip semiconductor package (e.g. using an interposer, or by using three-dimensional integration to provide a multi-layer chip product comprising two or more vertically stacked integrated circuit layers).

In some examples, a collection of chiplets (i.e. small modular chips with particular functionality) may itself be referred to as a chip. A chiplet may be packaged individually in a semiconductor package and/or together with other chiplets into a multi-chiplet semiconductor package (e.g. using an interposer, or by using three-dimensional integration to provide a multi-layer chiplet product comprising two or more vertically stacked integrated circuit layers).

The one or more packaged chips 400 are assembled on a board 402 together with at least one system component 404 to provide a system 406. For example, the board may comprise a printed circuit board. The board substrate may be made of any of a variety of materials, e.g. plastic, glass, ceramic, or a flexible substrate material such as paper, plastic or textile material. The at least one system component 404 comprise one or more external components which are not part of the one or more packaged chip(s) 400. For example, the at least one system component 404 could include, for example, any one or more of the following: another packaged chip (e.g. provided by a different manufacturer or produced on a different process node), an interface module, a resistor, a capacitor, an inductor, a transformer, a diode, a transistor and/or a sensor.

A chip-containing product 416 is manufactured comprising the system 406 (including the board 402, the one or more chips 400 and the at least one system component 404) and one or more product components 412. The product components 412 comprise one or more further components which are not part of the system 406. As a non-exhaustive list of examples, the one or more product components 412 could include a user input/output device such as a keypad, touch screen, microphone, loudspeaker, display screen, haptic device, etc.; a wireless communication transmitter/receiver; a sensor; an actuator for actuating mechanical motion; a thermal control device; a further packaged chip; an interface module; a resistor; a capacitor; an inductor; a transformer; a diode; and/or a transistor. The system 406 and one or more product components 412 may be assembled on to a further board 414.

The board 402 or the further board 414 may be provided on or within a device housing or other structural support (e.g. a frame or blade) to provide a product which can be handled by a user and/or is intended for operational use by a person or company. The system 406 or the chip-containing product 416 may be at least one of: an end-user product, a machine, a medical device, a computing or telecommunications infrastructure product, or an automation control system. For example, as a non-exhaustive list of examples, the chip-containing product could be any of the following: a telecommunications device, a mobile phone, a tablet, a laptop, a computer, a server (e.g. a rack server or blade server), an infrastructure device, networking equipment, a vehicle or other automotive product, industrial machinery, consumer device, smart card, credit card, smart glasses, avionics device, robotics device, camera, television, smart television, DVD players, set top box, wearable device, domestic appliance, smart meter, medical device, heating/lighting control device, sensor, and/or a control system for controlling public infrastructure equipment such as smart motorway or traffic lights.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, System Verilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and System Verilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

In brief overall summary there is provided an apparatus comprising first processing circuitry operating in a first clock domain having a first clock signal operating at a first clock period. The apparatus is provided with timeout period generation circuitry to couple with a second clock domain to generate a timeout clock signal, the second clock domain comprising second processing circuitry and having a second clock signal operating at a second clock period. The apparatus is provided with control circuitry to compare first data generated by the first processing circuitry against second data received from the second processing circuitry. The control circuitry is configured to indicate when the first and second data do not match within a timeout clock period. The timeout period generation circuitry is configured to receive second clock information indicative of the second clock period and to generate the timeout clock signal based on the second clock information and the first clock period.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

In the present application, lists of features preceded with the phrase "at least one of" mean that any one or more of those features can be provided either individually or in combination. For example, "at least one of: [A], [B] and [C]" encompasses any of the following options: A alone (without B or C), B alone (without A or C), C alone (without A or B), A and B in combination (without C), A and C in combination (without B), B and C in combination (without A), or A, B and C in combination.

Although illustrative configurations of the invention have been described in detail herein with reference to the accompanying drawings, it is to be understood that the invention is not limited to those precise configurations, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

Some configurations of the present techniques are described by the following numbered clauses:

Clause 1. An apparatus comprising:
first processing circuitry operating in a first clock domain having a first clock signal operating at a first clock period;
timeout period generation circuitry configured to couple with a second clock domain to generate a timeout clock signal having a timeout clock period, the second clock domain comprising second processing circuitry and having a second clock signal operating at a second clock period; and control circuitry configured to compare first data generated by the first processing circuitry against second data received from the second processing circuitry, and to indicate when the first data and the second data do not match within the timeout clock period, wherein the timeout period generation circuitry is configured to receive second clock information indicative of the second clock period from the second clock domain and to generate the timeout clock signal based on the second clock information and the first clock period.

Clause 2. The apparatus of clause 1, wherein the timeout period generation circuitry is configured to generate the timeout clock signal using a delay loop coupling the first clock domain to the second clock domain, the delay loop providing a first delay indicative of the first clock period to be combined with a second delay indicative of the second clock period provided in the second clock domain.

Clause 3. The apparatus of clause 2, wherein the timeout period generation circuitry is configured to:
receive, on the delay loop, an input clock generating signal from the second clock domain, the input clock generating signal indicative of an output clock generating signal received from the first processing circuitry on the delay loop delayed by an amount indicative of the second clock period;
delay the input clock generating signal by an amount indicative of the first clock period to generate the output clock generating signal; and
signal the output clock generating signal to the second clock domain using the delay loop.

Clause 4. The apparatus of clause 3, comprising synchronisation circuitry configured to receive, on the delay loop, an asynchronous input clock generating signal from the second clock domain and to store the asynchronous input clock generating signal for at least the first clock period in order to generate the input clock generating signal.

Clause 5. The apparatus of clause 4, wherein the synchronisation circuitry comprises a plurality of latch circuits arranged in series with one another and clocked using the first clock signal.

Clause 6. The apparatus of any of clauses 2 to 5, wherein the delay loop comprises invertor circuitry configured to invert one of the input clock generating signal and the output clock generating signal.

Clause 7. The apparatus of any preceding clause, wherein the control circuitry is configured to perform a comparison of each of a plurality of items of first data generated by the first processing circuitry against a corresponding one of a plurality of items of second data received from the second processing circuitry, each of the plurality of items of second data received through a different communication channel, wherein the control circuitry is configured for each comparison to issue a corresponding indication when that comparison does not match within the timeout clock period.

Clause 8. The apparatus of clause 7, wherein the control circuitry is configured to perform the comparison for each of the plurality of items of first data based on a same clock signal generated by the timeout period generation circuitry.

Clause 9. The apparatus of any preceding clause when dependent on clause 3, wherein the timeout period generation signal comprises comparison circuitry configured to output the timeout clock signal based on a comparison of the input clock generating signal against the output clock generating signal.

Clause 10. The apparatus of clause 9, wherein:
the timeout period generation circuitry is configured to delay the input clock generating signal using latch circuitry updated in response to the first clock signal; and
the comparison circuitry is configured to compare the input clock generating signal at an input of the latch circuitry against the output clock generating signal at an output of the latch circuitry.

Clause 11. The apparatus of any preceding clause, wherein:
the first processing circuitry is configured to interact with a plurality of processing circuitries each operating in a different clock domain, the plurality of processing circuitries comprising the second processing circuitry; and
the apparatus comprises a plurality of timeout period generation circuitries comprising the timeout period generation circuitry, each of the plurality of timeout period generation circuitries configured to interact with a corresponding one of the plurality of processing circuitries and each configured to generate a corresponding timeout clock signal.

Clause 12. The apparatus of any preceding clause, wherein the first clock signal and the second clock signal are asynchronous with one another.

Clause 13. The apparatus of any preceding clause, wherein the first clock period and the second clock signal are different from one another.

Clause 14. The apparatus of any preceding clause, comprising the second processing circuitry,
wherein:
the timeout period generation circuitry is first timeout period generation circuitry associated with the first processing circuitry; and
the apparatus comprises second timeout period generation circuitry associated with the second processing circuitry and configured to generate a second output clock generating signal for the second processing circuitry.

Clause 15. The apparatus of any preceding clause, wherein the first processing circuitry and the second processing circuitry are configured to operate in lockstep with one another.

Clause 16. The apparatus of any preceding clause, wherein at one of:
the first processing circuitry and the second processing circuitry are implemented on a same chip; and
the first processing circuitry and the second processing circuitry are implemented on separate chips.

Clause 17. A system comprising:
the apparatus of any preceding clause, implemented in at least one packaged chip;
at least one system component; and
a board,
wherein the at least one packaged chip and the at least one system component are assembled on the board.

Clause 18. A chip-containing product comprising the system of clause 17, wherein the system is assembled on a further board with at least one other product component.

Clause 19. A method of operating an apparatus comprising first processing circuitry operating in a first clock domain having a first clock signal operating at a first clock period, the method comprising:

coupling with a second clock domain, the second clock domain comprising second processing circuitry and having a second clock signal operating at a second clock period;

receiving second clock information indicative of the second clock period from the second clock domain and generating a timeout clock signal having a timeout clock period based on the second clock information and the first clock period; and comparing first data generated by the first processing circuitry against second data received from the second processing circuitry, and indicating when the first data and the second data do not match within the timeout clock period.

Clause 20. A non-transitory computer-readable medium storing computer-readable code for fabrication of the apparatus of any of clauses 1 to 18.

We claim:

1. An apparatus comprising:

first processing circuitry operating in a first clock domain having a first clock signal operating at a first clock period;

timeout period generation circuitry configured to couple with a second clock domain to generate a timeout clock signal having a timeout clock period, the second clock domain comprising second processing circuitry and having a second clock signal operating at a second clock period; and control circuitry configured to compare first data generated by the first processing circuitry against second data received from the second processing circuitry, and to indicate when the first data and the second data do not match within the timeout clock period, wherein the timeout period generation circuitry is configured to receive second clock information indicative of the second clock period from the second clock domain and to generate the timeout clock signal based on the second clock information and the first clock period.

2. The apparatus of claim 1, wherein the timeout period generation circuitry is configured to generate the timeout clock signal using a delay loop coupling the first clock domain to the second clock domain, the delay loop providing a first delay indicative of the first clock period to be combined with a second delay indicative of the second clock period provided in the second clock domain.

3. The apparatus of claim 2, wherein the timeout period generation circuitry is configured to:

receive, on the delay loop, an input clock generating signal from the second clock domain, the input clock generating signal indicative of an output clock generating signal received from the first processing circuitry on the delay loop delayed by an amount indicative of the second clock period;

delay the input clock generating signal by an amount indicative of the first clock period to generate the output clock generating signal; and signal the output clock generating signal to the second clock domain using the delay loop.

4. The apparatus of claim 3, comprising synchronisation circuitry configured to receive, on the delay loop, an asynchronous input clock generating signal from the second clock domain and to store the asynchronous input clock generating signal for at least the first clock period in order to generate the input clock generating signal.

5. The apparatus of claim 4, wherein the synchronisation circuitry comprises a plurality of latch circuits arranged in series with one another and clocked using the first clock signal.

6. The apparatus of claim 2, wherein the delay loop comprises invertor circuitry configured to invert one of the input clock generating signal and the output clock generating signal.

7. The apparatus of claim 1, wherein the control circuitry is configured to perform a comparison of each of a plurality of items of first data generated by the first processing circuitry against a corresponding one of a plurality of items of second data received from the second processing circuitry, each of the plurality of items of second data received through a different communication channel, wherein the control circuitry is configured for each comparison to issue a corresponding indication when that comparison does not match within the timeout clock period.

8. The apparatus of claim 7, wherein the control circuitry is configured to perform the comparison for each of the plurality of items of first data based on a same clock signal generated by the timeout period generation circuitry.

9. The apparatus of claim 3, wherein the timeout period generation signal comprises comparison circuitry configured to output the timeout clock signal based on a comparison of the input clock generating signal against the output clock generating signal.

10. The apparatus of claim 9, wherein:

the timeout period generation circuitry is configured to delay the input clock generating signal using latch circuitry updated in response to the first clock signal; and the comparison circuitry is configured to compare the input clock generating signal at an input of the latch circuitry against the output clock generating signal at an output of the latch circuitry.

11. The apparatus of claim 1, wherein:

the first processing circuitry is configured to interact with a plurality of processing circuitries each operating in a different clock domain, the plurality of processing circuitries comprising the second processing circuitry; and the apparatus comprises a plurality of timeout period generation circuitries comprising the timeout period generation circuitry, each of the plurality of timeout period generation circuitries configured to interact with a corresponding one of the plurality of processing circuitries and each configured to generate a corresponding timeout clock signal.

12. The apparatus of claim 1, wherein the first clock signal and the second clock signal are asynchronous with one another.

13. The apparatus of claim 1, wherein the first clock period and the second clock signal are different from one another.

14. The apparatus of claim 1, comprising the second processing circuitry, wherein:

the timeout period generation circuitry is first timeout period generation circuitry associated with the first processing circuitry; and the apparatus comprises second timeout period generation circuitry associated with the second processing circuitry and configured to generate a second output clock generating signal for the second processing circuitry.

15. The apparatus of claim 1, wherein the first processing circuitry and the second processing circuitry are configured to operate in lockstep with one another.

16. The apparatus of claim 1, wherein at one of:

the first processing circuitry and the second processing circuitry are implemented on a same chip; and the first processing circuitry and the second processing circuitry are implemented on separate chips.

17. A system comprising:

the apparatus of claim 1, implemented in at least one packaged chip;

at least one system component; and a board, wherein the at least one packaged chip and the at least one system component are assembled on the board.

18. A chip-containing product comprising the system of claim 17, wherein the system is assembled on a further board with at least one other product component.

19. A method of operating an apparatus comprising first processing circuitry operating in a first clock domain having a first clock signal operating at a first clock period, the method comprising:

coupling with a second clock domain, the second clock domain comprising second processing circuitry and having a second clock signal operating at a second clock period;

receiving second clock information indicative of the second clock period from the second clock domain and generating a timeout clock signal having a timeout clock period based on the second clock information and the first clock period; and comparing first data generated by the first processing circuitry against second data received from the second processing circuitry, and indicating when the first data and the second data do not match within the timeout clock period.

20. A non-transitory computer-readable medium storing computer-readable code for fabrication of an apparatus comprising:

first processing circuitry operating in a first clock domain having a first clock signal operating at a first clock period;

timeout period generation circuitry configured to couple with a second clock domain to generate a timeout clock signal having a timeout clock period, the second clock domain comprising second processing circuitry and having a second clock signal operating at a second clock period; and control circuitry configured to compare first data generated by the first processing circuitry against second data received from the second processing circuitry, and to indicate when the first data and the second data do not match within the timeout clock period, wherein the timeout period generation circuitry is configured to receive second clock information indicative of the second clock period from the second clock domain and to generate the timeout clock signal based on the second clock information and the first clock period.

* * * * *